Dec. 24, 1963 V. L. MULKEY ET AL 3,115,265
ELECTRICAL OUTLET BOX EXPANDABLE PROTECTOR
Filed March 27, 1962 2 Sheets-Sheet 1
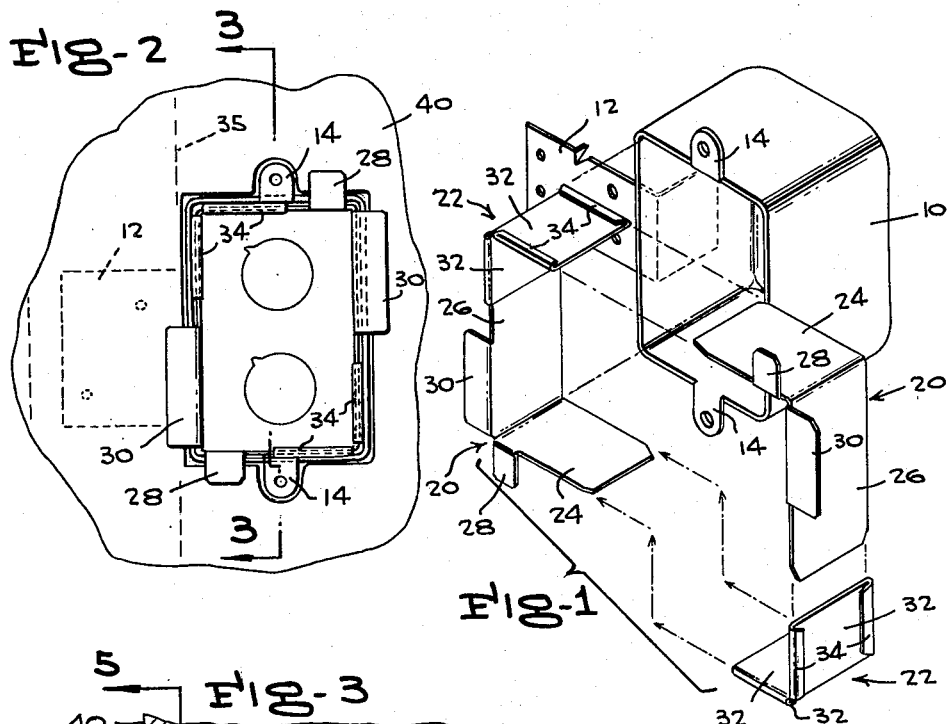
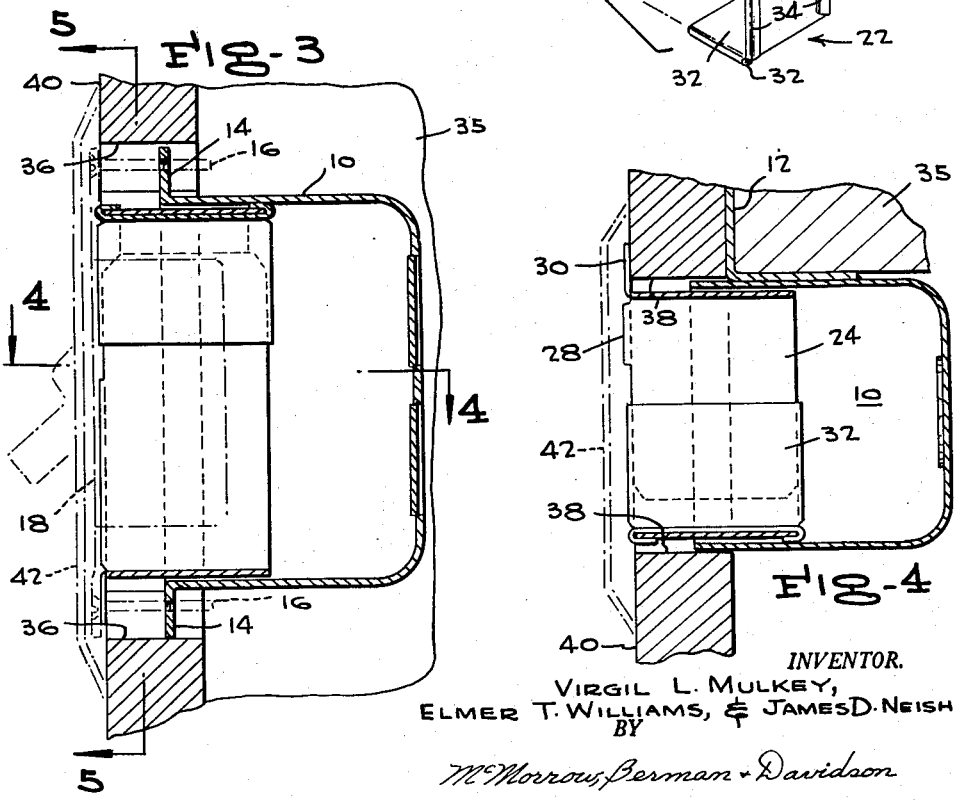
INVENTOR.
VIRGIL L. MULKEY,
ELMER T. WILLIAMS, & JAMES D. NEISH
BY
McMorrow, Berman & Davidson
ATTORNEYS Dec. 24, 1963 V. L. MULKEY ET AL 3,115,265
ELECTRICAL OUTLET BOX EXPANDABLE PROTECTOR
Filed March 27, 1962 2 Sheets-Sheet 2
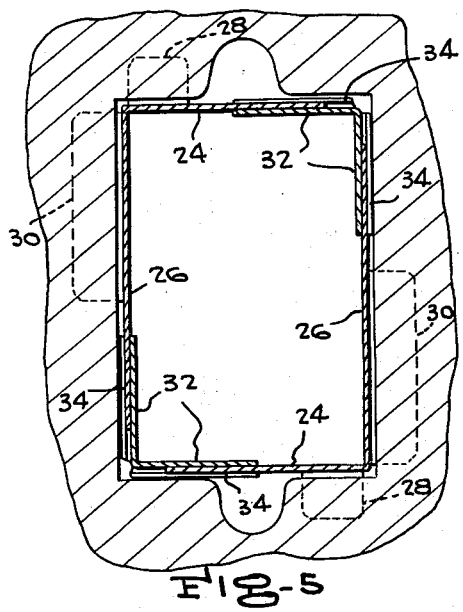
Fig-5
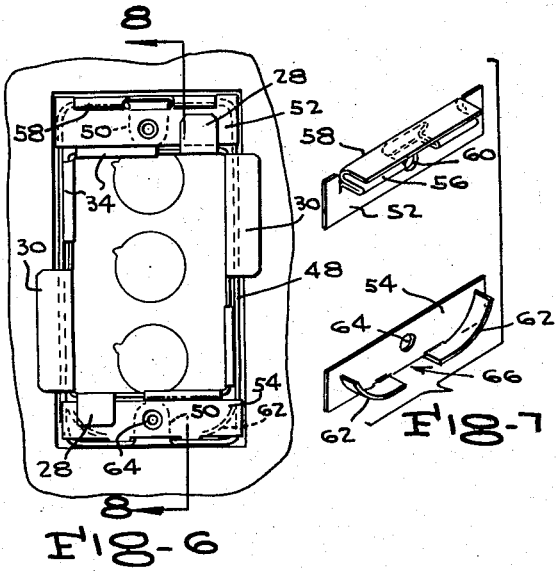
Fig-6
Fig-7
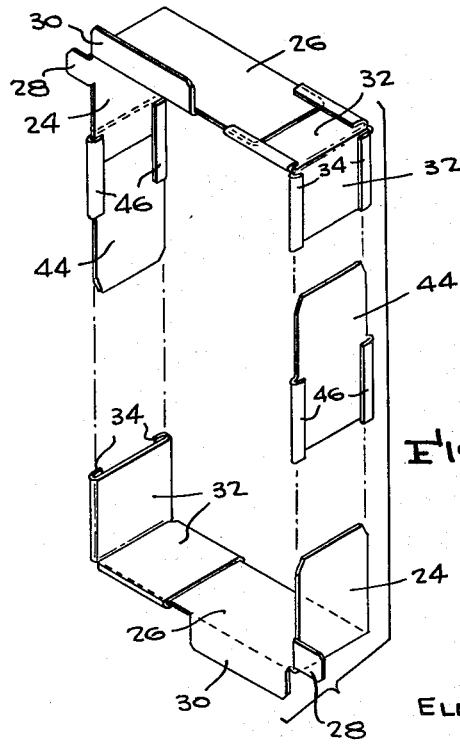
Fig-9
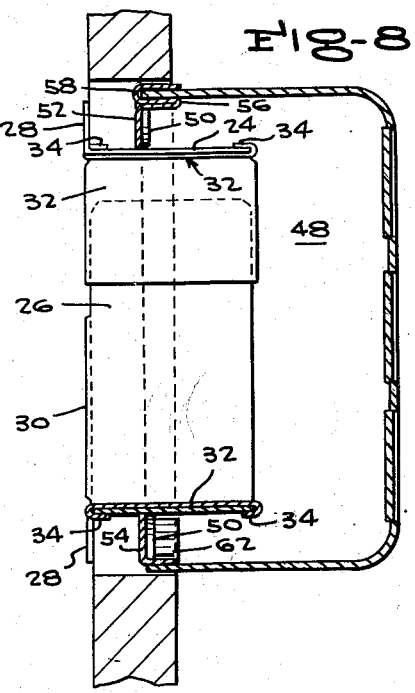
Fig-8
INVENTOR.
VIRGIL L. MULKEY,
ELMER T. WILLIAMS, & JAMES D. NEISH
BY
McMorrow, Berman & Davidson
ATTORNEYS United States Patent Office 3,115,265
Patented Dec. 24, 1963

3,115,265
ELECTRICAL OUTLET BOX EXPANDABLE PROTECTOR
Virgil L. Mulkey, Glendale, Ariz. (3528 W. Minnezona, Phoenix, Ariz.); James D. Neish, 1819 W. Fairmont, Phoenix, Ariz.; and Elmer T. Williams, Phoenix, Ariz.; said Williams assignor to said Mulkey and said Neish
Filed Mar. 27, 1962, Ser. No. 182,824
7 Claims. (Cl. 220—3.5)

This invention relates to protectors for electrical outlet boxes, and in particular to a shield for covering exposed edges of combustible walls adjacent such boxes.

The National Electrical Code provides that in walls or ceilings of combustible material, the front edge of the box must be flush with the wall or ceiling surface. However, in the roughing-in of wiring, the boxes are frequently nailed into place in the studding or other structure, in contemplation of a non-combustible wall, in which case exposure of ¼ inch of the wall depth around the box is permissible, but it turns out, eventually that the wall is of combustible material. This has necessitated ripping out and re-setting the box, which is difficult in any case, but particularly after the wall surface has been installed. We have found that the difficulties in this regard are eliminated by the use of a shielding frame, which is installed by the simple act of insertion within the box opening, the frame being composed of sliding components whereby it is adapted to fit boxes in a variety of sizes.

It is therefore a general object of the invention to avoid removal and re-setting of outlet boxes to cover exposed wall edges. More particularly it is an object to provide an edge-protecting frame which is insertable in outlet boxes. A further object is to provide a sectionalized protector, adjustable to fit various box sizes. Yet another object is to provide a sectionalized protector as aforesaid, having adaptor elements for further extending the size range. A still further object is to provide a protector frame insertable in outlet boxes, and requiring no auxiliary fastening means.

These and other ends, which will become apparent, are attained by the present invention, preferred forms of which are described in the following specification, as illustrated in the drawings, in which:

FIGURE 1 is a perspective view of a conventional wall switch box, with the sectionalized, protective frame shown in exploded form in front of the open face of the box, FIGURE 2 is a front elevational view of the box of FIGURE 1, as mounted in a niche in a wall, and with the protector frame assembled and mounted in the box.

FIGURE 3 is a sectional view, enlarged, taken on the plane of the line 3—3 of FIGURE 2, FIGURE 4 is a sectional view, taken on the plane of the line 4—4 of FIGURE 3, FIGURE 5 is a sectional view taken on the plane of the line 5—5 of FIGURE 3, FIGURE 6 is a view similar to FIGURE 2, showing the protector in association with another type of switch box, FIGURE 7 is a bracketed view, in perspective, showing two adaptors used in the mounting of the protector of FIGURE 6, FIGURE 8 is a sectional view, taken on the plane of the line 8—8 of FIGURE 6, and FIGURE 9 is an exploded view, in perspective, of a protector frame, employing adaptor pieces, inserted to increase the size range.

Referring to the drawings by characters of reference, there is shown, in FIGURE 1, a conventional wiring box 10, for a wall switch, carrying on one side a perforated, extending flange 12, by which it is secured to studding or other structural elements, and having perforated ears 14 at top and bottom, adapted to receive the fastening screws 16 (FIGURE 3) of a wall switch unit 18.

As best seen in FIGURE 1, the protecting frame, or shield, in the form of a band or fence, comprises two identical pairs of corner pieces, 20 and 22. Each piece 20 comprises a pair of flat sides 24, 26, the former having a small, perpendicularly bent tab 28, and side 26 having a somewhat wider perpendicularly bent tab 30. All corners are bevelled, and this is particularly useful in the case of sides 24, 26, which are inserted in the other corner parts during assembly. Corner pieces 22 have identical, perpendicularly disposed sides 32, each having its side edges reversely bent on the outside, to provide tabs 34, which receive the sides 24 and 26 of the other corner pieces 20, for slidable adjustment, to provide a rectangular frame, which is adjustable as to its enclosed area. The tabs 34 may, alternatively, be bent so as to overlie the inside faces of the corner piece.

FIGURES 3 and 4 illustrate the situation wherein the roughed-in switch box 10, secured to a vertical stud 35, has its outer terminus in a plane which leaves exposed substantial areas 36, 38, of the respective, opposite pairs of edges of the opening in the wall board 40. To mask these exposed edges, the protector frame is assembled, by inserting the straight sides of pieces 20 in the slots formed by tabs 34 of pieces 22, contracting the assembled frame to a size less than that of the opening in box 10, inserting it into the box opening until tabs 28, 30 contact the wall board 40, and finally, expanding the frame into contact with the four inner, side faces of box 10. When the switch unit 18 is mounted in the box, its screw-holding, front cross piece bears against the outer edges of the top and bottom sides of the masking frame, and thus holds it firmly in place by pressing tabs 28 and 30 against the wall board. Very little holding pressure is required, since the frame is for masking purposes only, and is not subject to any loading stresses. After mounting of the switch unit, the usual wall plate 42 is added.

If it is desired to further enlarge the range of extensibility of the protector frame, additional pieces, or adaptors, may be employed, as illustrated in FIGURE 9. As shown, the two vertical sides of the frame are arranged for extra extension, by the use of auxiliary, flat panels 44, one half of the lengths of opposite side edges of which have folded tabs 46, similar in form and purpose to the tabs 34 of corner pieces 22. Thus, the end of panel 44 having the folded tabs 46 is received on plate 24 of corner piece 20, and the other flat end of panel 44 is received within the folds of one set of tabs 34 of a corner plate 22.

Some switch boxes may have inwardly extending ears, such as the box 48, shown in FIGURES 6 to 8, with ears 50. Since these ears limit the vertical spread of the protector frame, leaving exposed areas of the open face of the box on each side of each ear, auxiliary masking plates 52, 54, are provided to close off these areas. In the preferred embodiment, these are of different construction at the top and bottom of the box, but one type may be used for both top and bottom. As shown, the top plate 52 has a perpendicularly extending, doubly folded portion comprising a lower, flattened loop 56, and an upper loop 58, with sufficient spacing to be received snugly on the outer edge of the top side of box 48. The plate has a central opening 60 to pass the fastening screw of the switch unit. The lower plate 54 has a pair of integral, arcuate tabs 62, perpendicular to the face of the plate. The lower ends of these tabs are adapted to dwell on the inner face of the lower side of the box, and the tabs contact the inner faces of the side walls to provide a frictional, gripping action. The lower plate also has a central opening 64 to pass a fastening screw. The central slot 66 is to clear the lower ear 50. Thus, in this embodiment, masking of two opposite edges of the wall board opening is accomplished by plates arranged perpendicularly to the wall surface, and masking of the other pair of opposite edges is accomplished by plates arranged parallel to the wall surface.

While certain preferred embodiments have been shown and described, various other modifications will become apparent in the light of this disclosure, and the invention should not, therefore, be deemed as limited, except insofar as shall appear from the spirit and scope of the appended claims.

We claim:

1. The combination, with an electrical outlet box having side walls and end walls, the box being mounted adjacent a wall having an opening therein with exposed wall edges, the box being spaced from the wall, of an adjustable protector for the exposed wall edges, comprising:
   (a) a substantially rectangular band including two pairs of connected corner pieces;
   (b) each piece of one pair of corner pieces having two substantially rectangular sections arranged in substantially a right angle at a vertex;
   (c) a tab extending outwardly from meeting side edges of the sections on one side of the piece adjacent said vertex;
   (d) the tabs being of different lengths;
   (e) each piece of the other pair comprising a pair of substantially rectangular sections arranged at substantially a right angle, the latter section having side edges folded inwardly to form slide pockets slidably receiving the side edges of the section of the corner piece of said one pair; and
   (f) the band fitting within the outlet box bearing against the side and end walls thereof and being extended outwardly to at least cover the exposed wall edges with the tabs overlying the adjacent wall surface.

2. The combination of claim 1, wherein:
   (a) each of the sections of the band includes bevelled corners.

3. The combination, with an electrical outlet box having side walls and end walls, the box being mounted adjacent a wall having an opening therein with exposed wall edges, the box being spaced from the wall, the box end walls including inwardly extended ears, of an adjustable protector for the exposed wall edges, comprising:
   (a) a substantially rectangular band including two pairs of connected corner pieces;
   (b) each piece of one pair of corner pieces having two substantially rectangular sections arranged in substantially a right angle at a vertex;
   (c) a tab extending outwardly from meeting side edges of the sections on one side of the piece adjacent said vertex;
   (d) the tabs being of different lengths;
   (e) each piece of the other pair comprising a pair of substantially rectangular sections arranged at substantially a right angle, the latter section having side edges folded inwardly to form slide pockets slidably receiving the side edges of the section of the corner piece of said one pair; and
   (f) masking plates of generally rectangular form having openings formed therein to fit about the ears of the end walls; and
   (g) the band fitting within the outlet box bearing against the side walls and masking plates and being extended outwardly to at least cover the exposed wall edges.

4. The combination of claim 3, wherein:
   (a) each masking plate includes doubly folded, integral flanges extended perpendicularly from one side thereof.

5. The combination of claim 3, wherein:
   (a) the masking plate includes a pair of arcuate fingers, each attached to the plate at one end thereof, and extending perpendicularly therefrom.

6. The combination, with an electrical outlet box having side walls and end walls, the box being mounted adjacent a wall having an opening therein with exposed wall edges, the box being spaced from the wall, of an adjustable protector for the exposed wall edges comprising:
   (a) a band of an outline form adapted to fit within the outlet box;
   (b) the band including plural, substantially rectangular elements slidably engaged with the adjacent one thereof to permit adjustment of the band; and
   (c) the band fitting within the outlet box bearing against the side and end walls thereof, and being extended outwardly to at least cover the exposed wall edges.

7. The combination of claim 6, and:
   (a) adapter plates fitted between the band elements for further expansion thereof.

References Cited in the file of this patent
UNITED STATES PATENTS

| | | |
|---|---|---|
| 791,598 | Woodland | June 6, 1905 |
| 1,091,623 | Bland | Mar. 31, 1914 |
| 1,548,347 | Braden | Aug. 4, 1925 |
| 1,578,357 | Parkins | Mar. 30, 1926 |
| 1,695,222 | Arnold et al. | Dec. 11, 1928 |
| 1,771,039 | Hedglon | July 22, 1930 |
| 1,857,141 | Corley | May 10, 1932 |
| 2,242,290 | Dember | May 20, 1941 |
| 2,422,553 | Johansson et al. | June 17, 1947 |
| 2,872,504 | Woodring | Feb. 3, 1959 |